(12) United States Patent
Liao et al.

(10) Patent No.: US 6,994,008 B2
(45) Date of Patent: Feb. 7, 2006

(54) TABLE SAW

(76) Inventors: Juei-Seng Liao, No. 195, Sec. 1, Nanking E. Rd., Taichung City (TW); Pei-Lieh Chiang, No. 12, Nan-Ping Rd., Nan Dist., Taichung City (TW)

( * ) Notice: Subject to any disclaimer, the term of this patent is extended or adjusted under 35 U.S.C. 154(b) by 0 days.

(21) Appl. No.: 10/674,557

(22) Filed: Oct. 1, 2003

(65) Prior Publication Data

US 2004/0237742 A1    Dec. 2, 2004

(30) Foreign Application Priority Data

May 30, 2003    (TW) .............................. 92210018 U

(51) Int. Cl.
*B23D 45/06*    (2006.01)

(52) U.S. Cl. ...................... 83/473; 83/477.1; 83/477.2

(58) Field of Classification Search ............... 83/477.2, 83/477.1, 473

See application file for complete search history.

(56) References Cited

U.S. PATENT DOCUMENTS

| 9,544 A | * | 1/1853 | Cook ........................ 83/477.2 |
| 6,283,002 B1 | * | 9/2001 | Chiang ..................... 83/477.1 |
| 6,530,303 B1 | * | 3/2003 | Parks et al. .................. 83/473 |
| 6,722,242 B2 | * | 4/2004 | Chuang ..................... 83/471.3 |
| 2002/0096030 A1 | * | 7/2002 | Wang ........................ 83/477.1 |
| 2003/0200851 A1 | * | 10/2003 | Yu ............................ 83/471.3 |
| 2004/0118261 A1 | * | 6/2004 | Garcia et al. .............. 83/471.3 |

* cited by examiner

*Primary Examiner*—Kenneth E. Peterson
(74) *Attorney, Agent, or Firm*—Foley & Lardner LLP

(57) ABSTRACT

A table saw includes a worktable turnable relative to a mounting frame, a support seat journalled on bearing members of the mounting frame and slidable relative thereto along a sliding path, and a saw blade rotated with a blade shaft driven by a motor. A spindle is rotatably mounted to the support seat and is coupled to the blade shaft so as to move the blade shaft when rotated, thereby adjusting height of the saw blade relative to the worktable. An inclination adjusting member is disposed to actuate the support seat to move along the sliding path so as to change an angular position of the saw blade relative to the worktable.

9 Claims, 12 Drawing Sheets

TABLE SAW

CROSS-REFERENCE TO RELATED APPLICATION

This application claims priority of Taiwanese Application No. 092210018, filed on May 30, 2003.

BACKGROUND OF THE INVENTION

1. Field of the Invention

This invention relates to a table saw, more particularly to a table saw which has height and inclination adjusting units for adjusting a saw blade relative to a worktable.

2. Description of the Related Art

Referring to FIGS. 1 to 4, a table saw 10 disclosed in U.S. Pat. No. 6,283,002 is shown to include amounting frame 11 having upright front and rear walls 111,112 and a worktable 113 on top ends of the front and rear walls 111,112, opposite front and rear support plates 12,13, two opposite support rods 14, a transmission unit 15 secured to the support rods 14, a saw frame 16 mounted swingably on the front support plate 12, a saw blade 17 mounted on and rotated with a blade shaft 163 of the saw frame 16, a height adjusting unit 18 disposed between the front wall 111 and the saw frame 16, and an inclination adjusting unit 19 disposed between the front wall 111 and the front support plate 12.

Opposite front and rear locking seats 114,115 are secured on a bottom side of the worktable 113, and respectively have front and rear curved grooves 116,117.

The front and rear support plates 12,13 respectively have curved slide protrusions 121,131 which are respectively and slidably disposed in the grooves 116,117.

The transmission unit 15 includes a pivot bracket 152 pivoted to the support rods 14 by means of two coupling blocks 151, and a motor 153 secured on the pivot bracket 152.

The saw frame 16 has a pivot arm portion 161 and a sector gear portion 162. The blade shaft 163 extends through the pivot arm portion 161 and is driven by an output shaft 154 of the motor 15 through a belt-and-pulley mechanism 164 to rotate the saw blade 17.

The height adjusting unit 18 includes a rod 181 rotatably mounted between the front wall 111 and the front support plate 12, a worm 83 secured on the rod 181 and meshes with the sector gear portion 162 such that rotation of the rod 181 can actuate movement of the pivot arm portion 161 so as to adjust the height of the saw blade 17 relative to the worktable 113.

The inclination adjusting unit 19 includes a mount seat 191 secured on an underside of the worktable 113, a rod 192 is disposed between the front wall 111 and the mount seat 191, a female screw member 193 secured on the front support plate 12, a screw rod 194 engaging threadedly the female screw member 193, and two bevel gears 195,196 respectively mounted on the rod 192 and the screw rod 194 and meshing with each other. As such, rotation of the rod 192 can actuate the screw rod 194 to rotate relative to the female screw member 193 so as to move the front support plate 12 and the rear support plate 13 along paths respectively defined by the grooves 116,117, thereby adjusting the inclination of the saw blade 17 relative to the worktable 113.

Although the saw blade 17 of the conventional table saw 10 is movable upward and downward and is inclinable, it is disadvantageous in that, during assembling, the worktable 113 has to be turned upside down to permit assembly of component parts to the underside of the worktable 113. After that, the worktable 113 has to be restored to its original position to be fastened onto the top ends of the front and rear walls 111,112. The task of assembly is therefore relatively inconvenient to conduct. Moreover, replacement of the saw blade 17 and maintenance of the table saw 10 are also inconvenient. Furthermore, the worktable 113 has to have better structural strength in order to bear the weight of the component parts mounted thereon, thereby resulting in a relatively heavy construction.

SUMMARY OF THE INVENTION

The object of the present invention is to provide a table saw which is capable of overcoming the aforementioned problems.

According to this invention, the table saw includes a mounting frame, a worktable, a support seat, a motor, a blade shaft, a saw blade, a spindle, a coupler, a height adjusting rod, an inclination adjusting member, and a fastening member.

The mounting frame has first and second side frame portions spaced apart from each other in a longitudinal direction to define an accommodation space therebetween, and first and second bearing members secured on the first and second side frame portions, respectively. Each of the first and second side frame portions extends in a transverse direction relative to the longitudinal direction, and defines a sliding path. The first side frame portion has an access slot extending in the transverse direction and along a path that corresponds to the sliding path.

The worktable is mounted on and is turnable relative to one of the first and second side frame portions so as to shield or expose the accommodation space.

The support seat is received in the accommodation space, and includes first and second supported ends which are opposite to each other in the longitudinal direction and which are configured to be journalled on the first and second bearing members, respectively, and to be slidable relative thereto along the sliding path, and a seat frame which is interposed between the first and second supported ends, and which includes mount and seat segments disposed proximate to the first and second supported ends, respectively.

The motor is mounted under the mount segment, is pivotable relative to the mount segment about a pivot axis in the transverse direction, and has an output shaft extending in the transverse direction to deliver a driving force.

The blade shaft includes mount and driven ends disposed at opposite sides of the seat segment in the transverse direction. The driven end is coupled to the output shaft so as to be driven by the driving force to rotate about a first axis parallel to the pivot axis. The blade shaft further includes a shaft body interposed between the mount and driven ends.

The saw blade is mounted to be rotated with the mount end of the blade shaft, and has a cutting region which extends above the worktable in an upright direction.

The spindle is mounted on the mount segment, and is rotatable relative to the mount segment about a second axis parallel to the first axis.

The coupler is disposed to couple the spindle to the shaft body such that when the spindle is rotated about the second axis from a starting point to an end point, the shaft body is turned about the second axis from a first angular position to a second angular position.

The height adjusting rod includes an actuating end which is disposed to actuate the spindle to rotate about the second axis, an operating end which is opposite to the actuating end in the longitudinal direction and which is disposed outwardly of the first side frame portion so as to be operated externally, and a shank segment which is interposed between the actuating end and the operating end, which passes through the first access slot, and which is shiftable along the path of the access slot.

The inclination adjusting member is disposed to actuate the first supported end to move along the sliding path so as to change an angular position of the cutting region of the saw blade relative to the worktable.

The fastening member is disposed to releasably fasten the first supported end relative to the first side frame portion.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
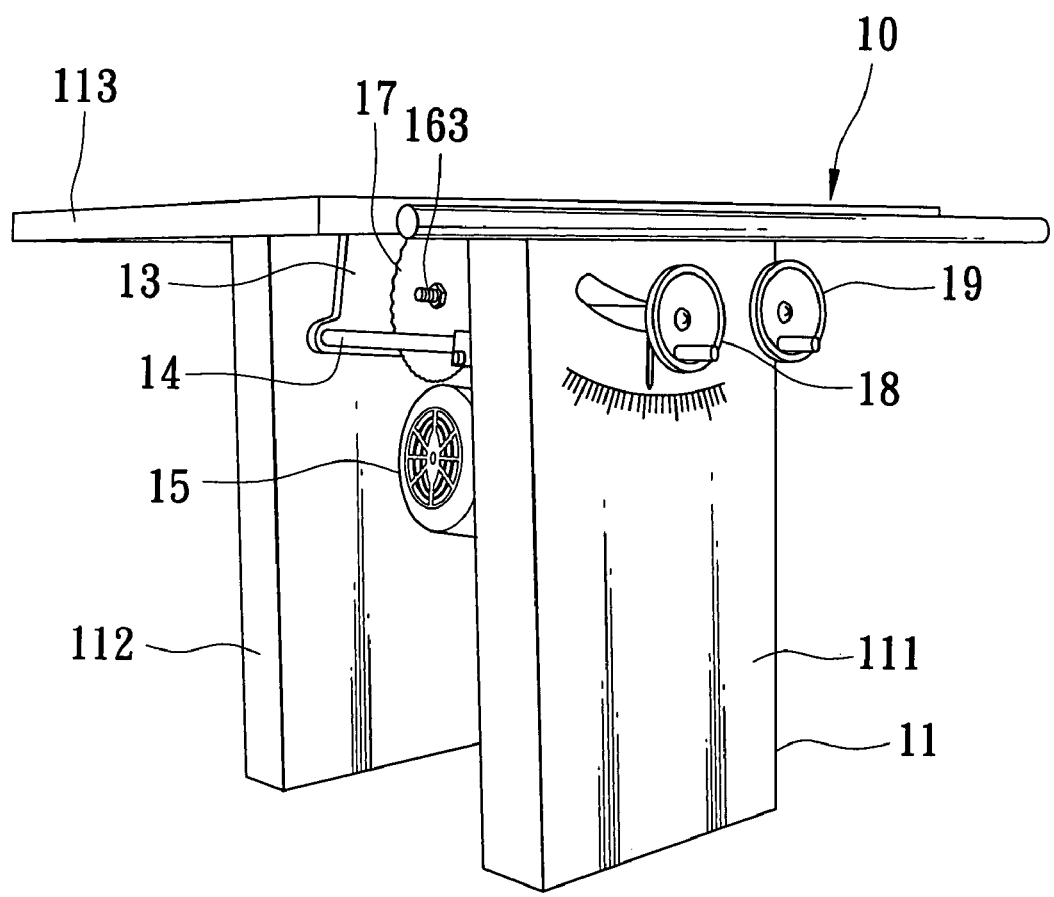
FIG. 1 is a perspective view of a conventional table saw.
Figure 2:
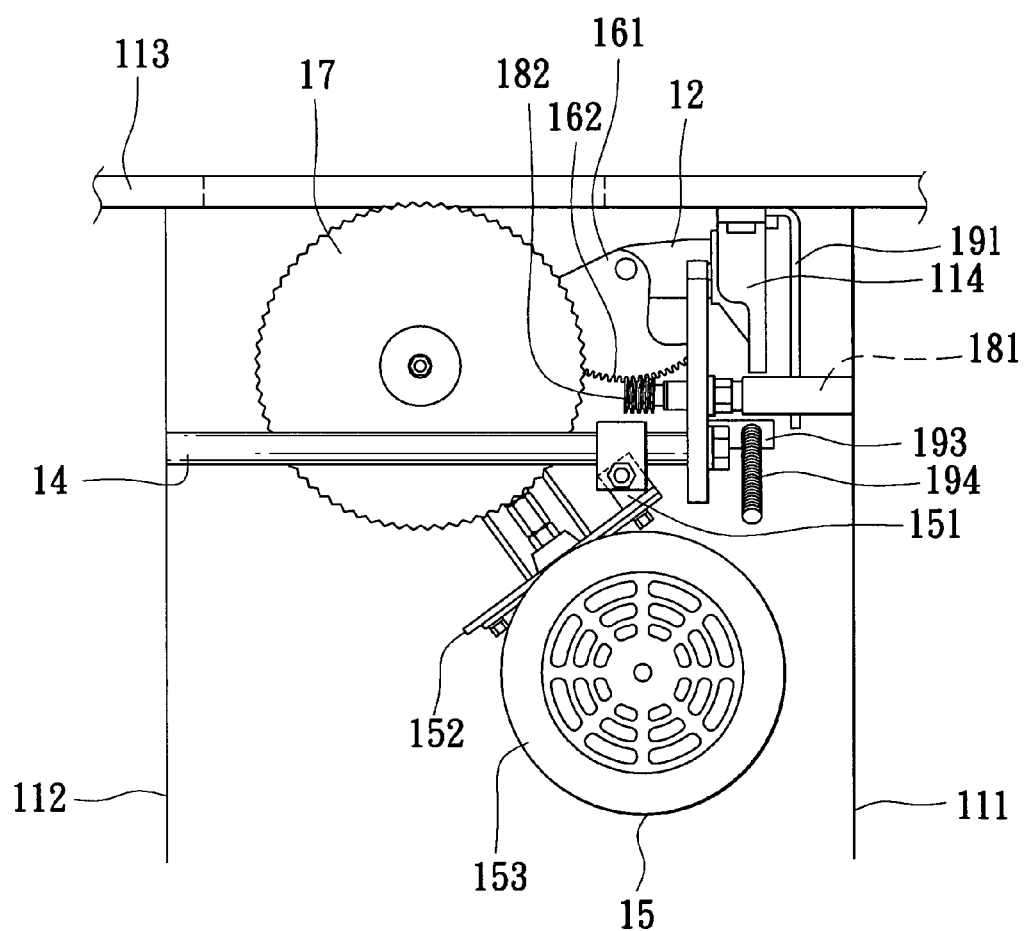
FIG. 2 is a schematic side view of the conventional table saw.
Figure 3:
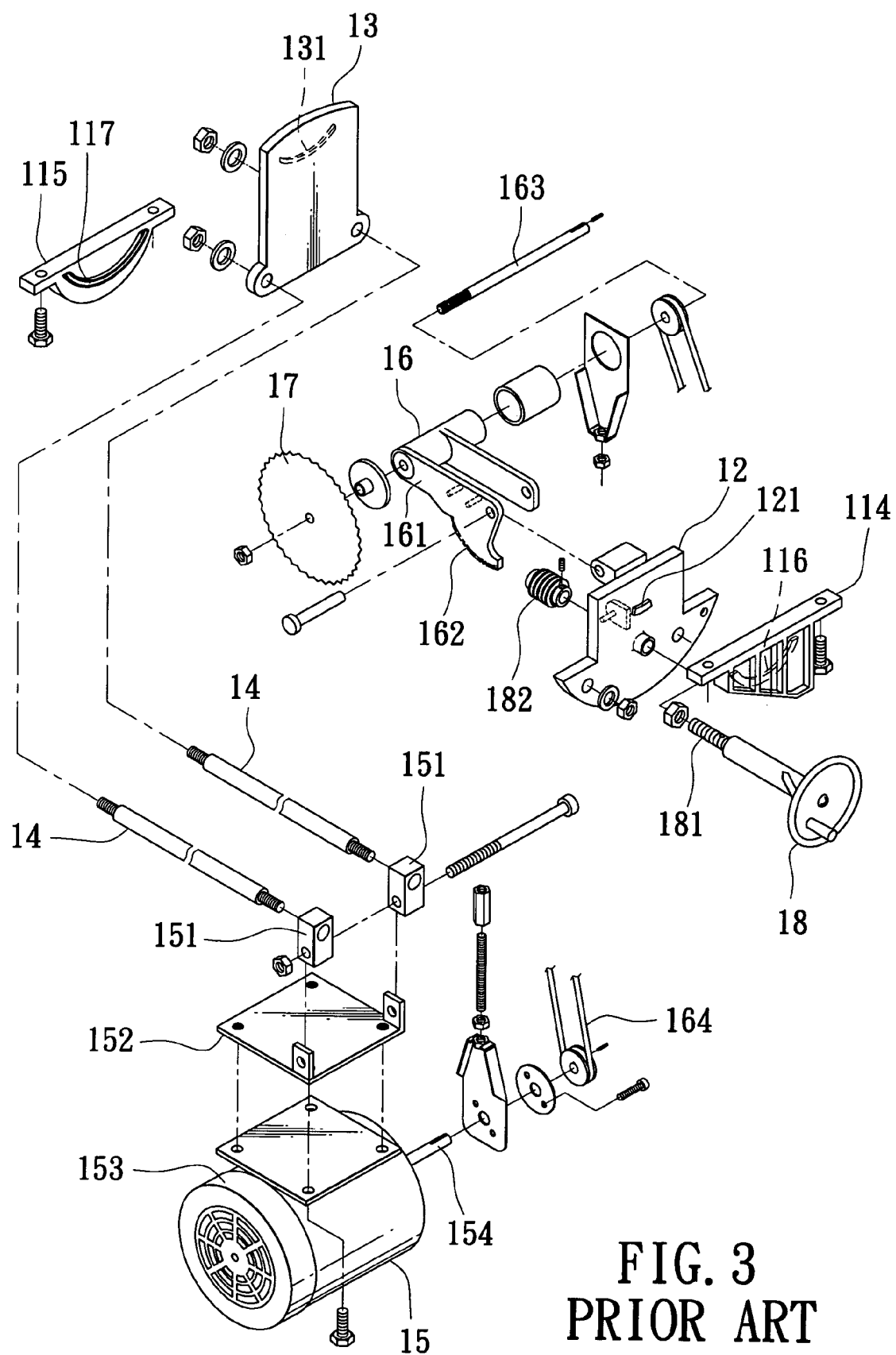
FIG. 3 is an exploded perspective view of the conventional table saw.
Figure 4:
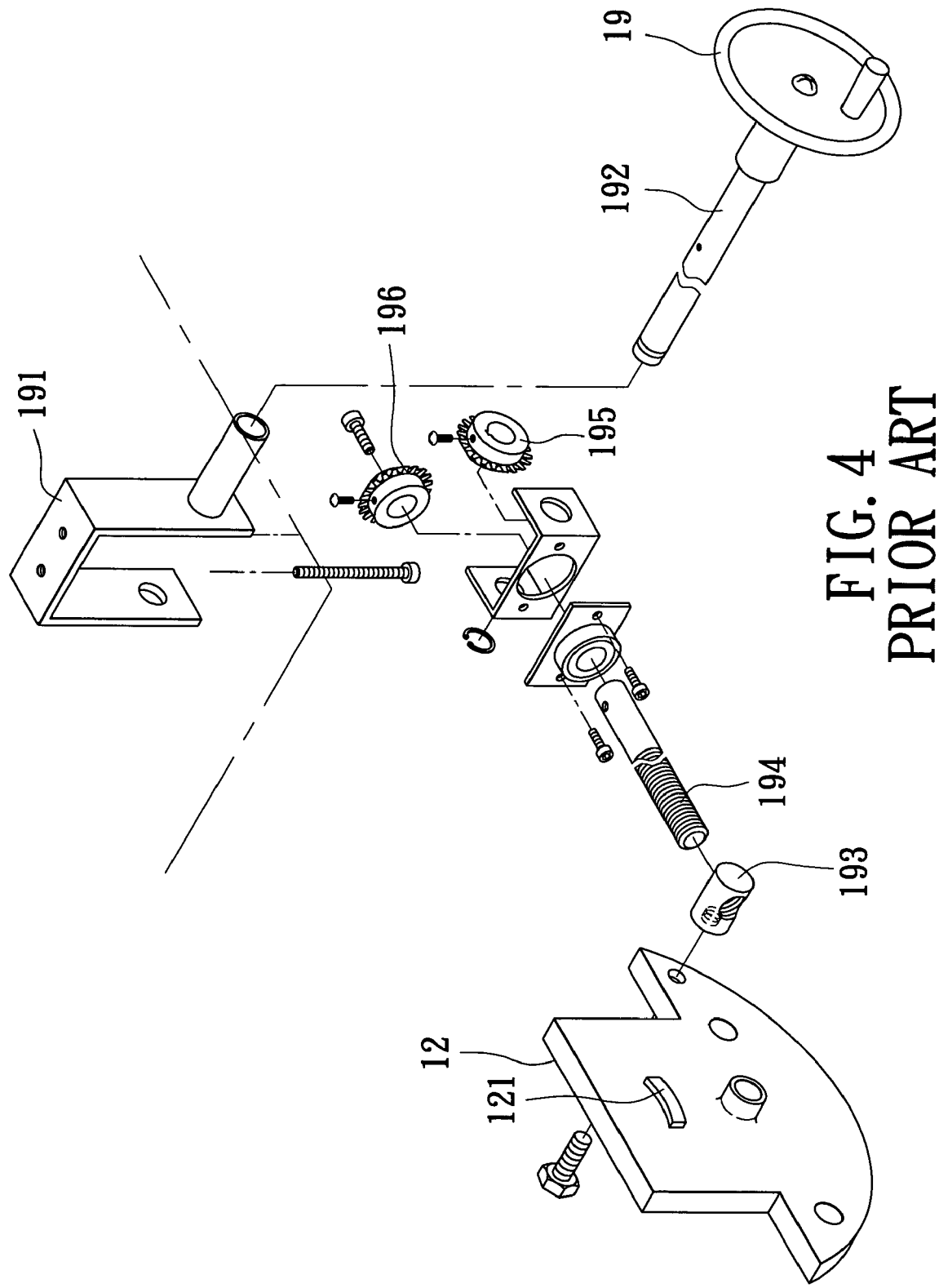
FIG. 4 is a fragmentary exploded view of the conventional table saw.
Figure 5:
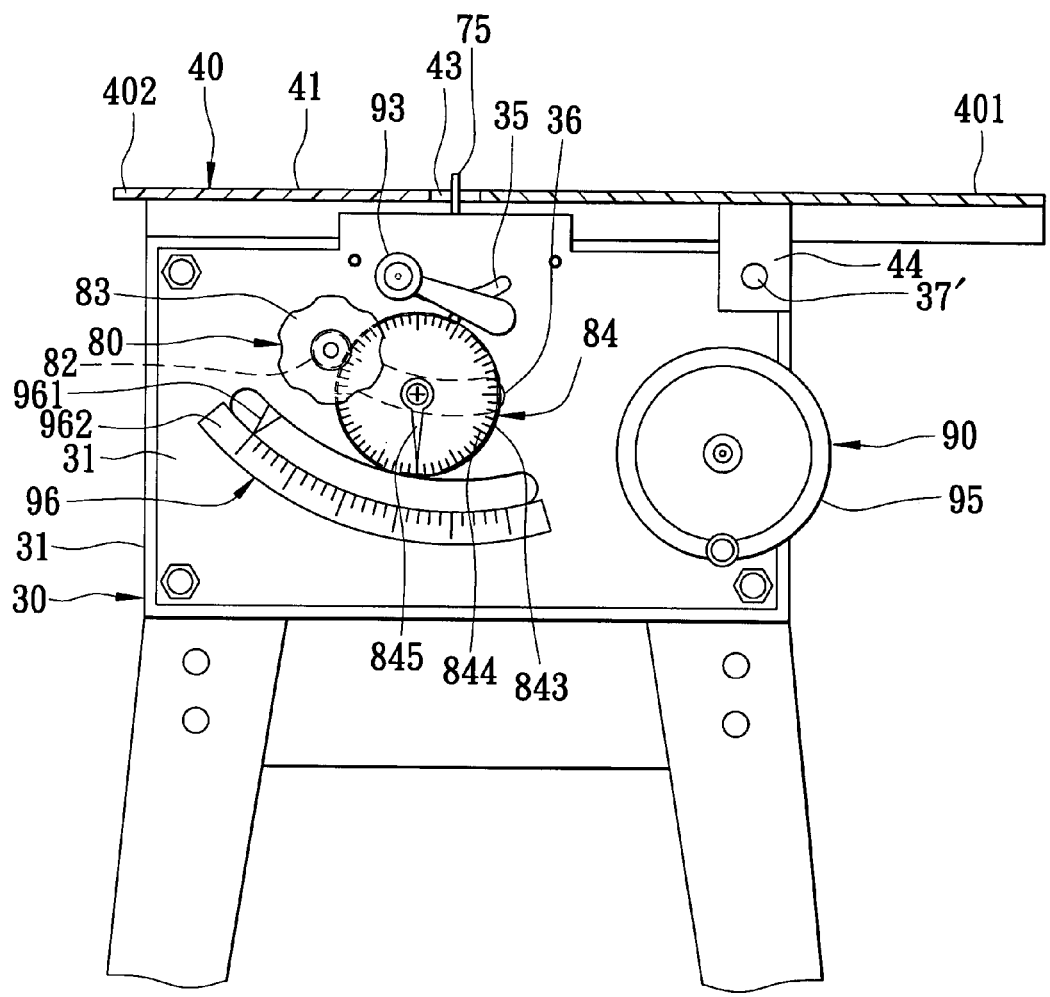
FIG. 5 is a schematic front view of the preferred embodiment of a table saw according to this invention.
Figure 6:
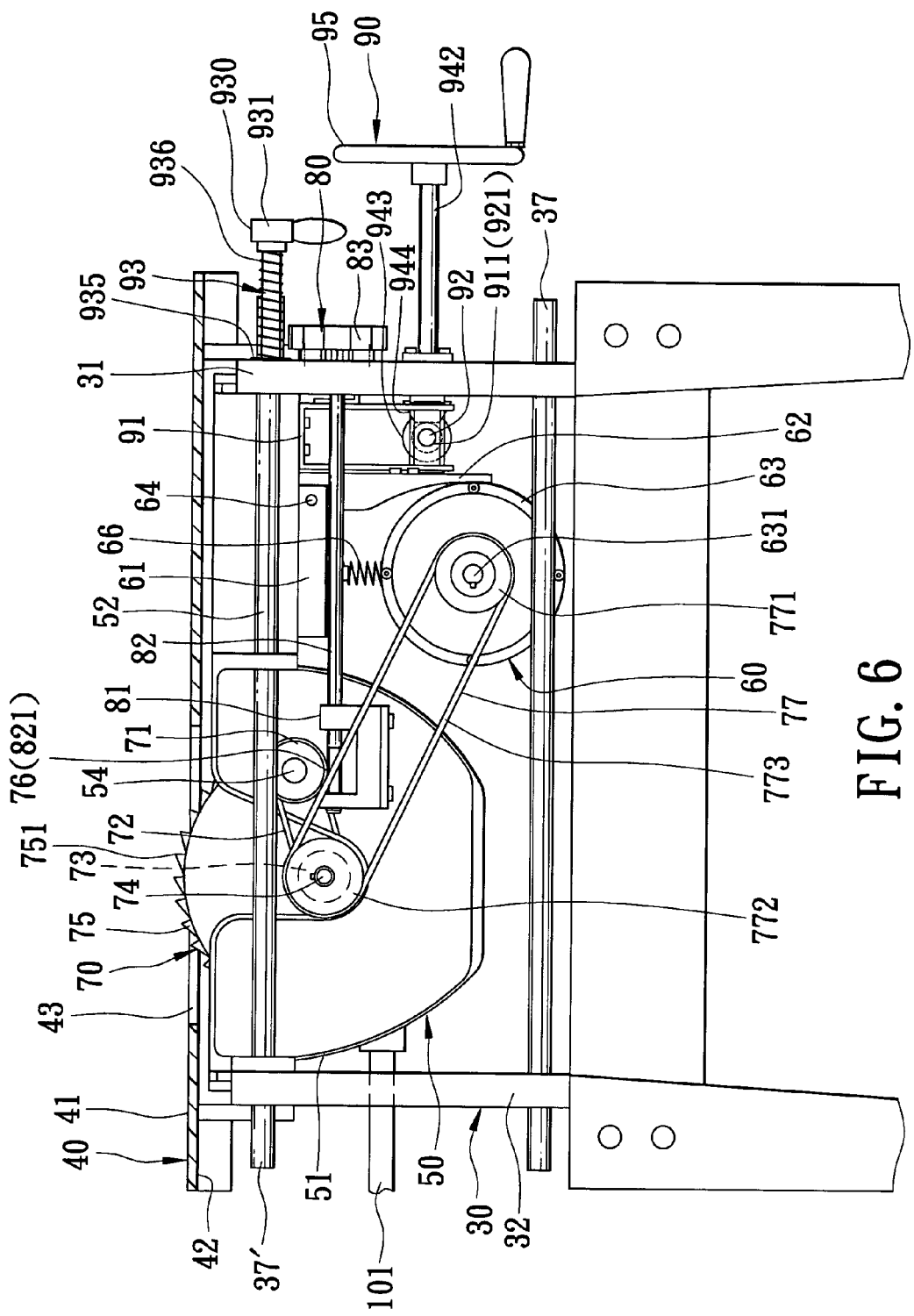
FIG. 6 is a schematic, partly sectioned side view of the preferred embodiment.

Referring to FIGS. 5 and 6, the preferred embodiment of a table saw according to the present invention is shown to comprise a mounting frame 30, a worktable 40, a support seat 50, a transmission unit 60, a cutting unit 70, a height adjusting unit 80, and an inclination adjusting unit 90.

Figure 8:
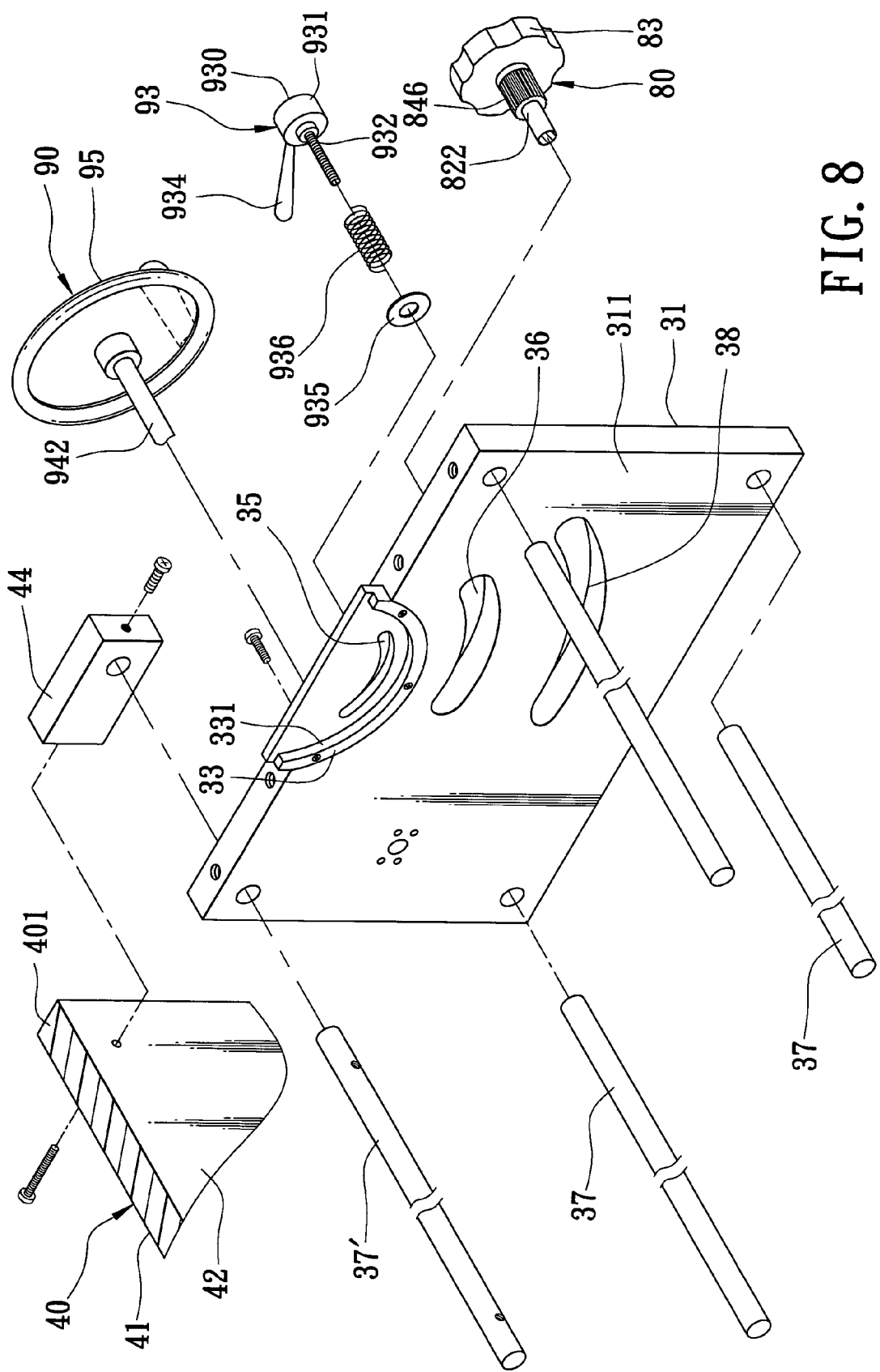
Figure 9:
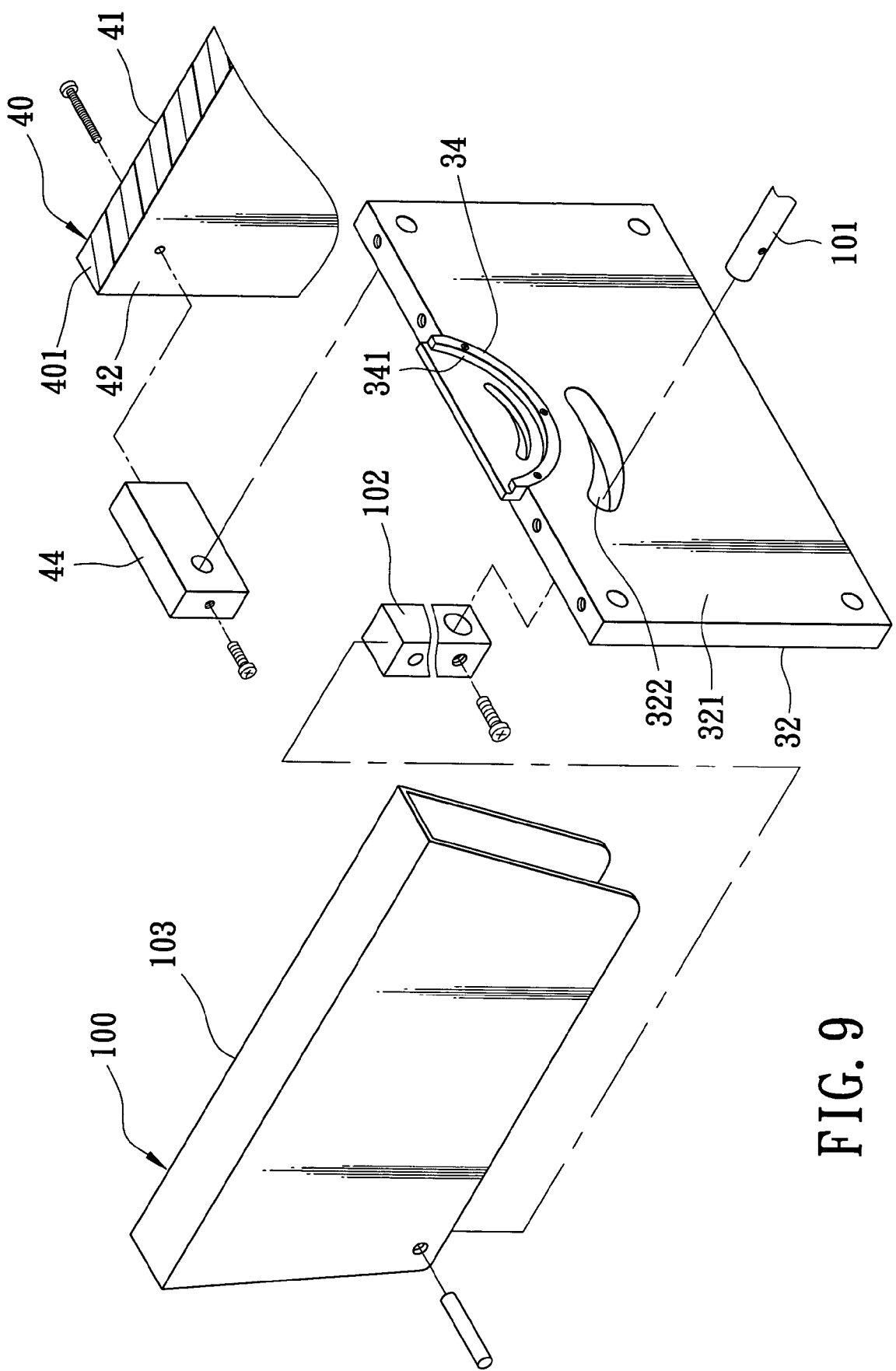

With reference to FIGS. 6, 8 and 9, the mounting frame 30 includes upright first and second side frame portions 31,32 which are spaced apart from each other in a longitudinal direction to define an accommodation space therebetween, and first and second bearing members 33,34 which are secured on inner surfaces 311,321 of the first and second side frame portions 31,32, respectively. Each of the first and second bearing members 33,34 has an upper surface 331,341 which extends in a transverse direction relative to the longitudinal direction and which defines a sliding path that is of an arc-shape and that is concaved downwardly and in an upright direction. The first side frame portion 31 has first and second access slots 36,35 which extend in the transverse direction and along first and second paths, respectively, which correspond to the sliding path defined by the upper surface 331, and which are formed under and above the first bearing member 33, respectively. The second side frame portion 32 has a third access slot 322 which is formed therein and which defines a third path that corresponds to the sliding path defined by the upper surface 341. Four coupling rods 37,37' are disposed to interconnect the first and second side frame portions 31,32.

The worktable 40 has a top surface 41 for supporting a workpiece (not shown) thereon, a bottom surface 42, an opening 43 extending from the top surface 41 through the bottom surface 42, and a coupling block 44 (see FIG. 5) which is secured on the bottom surface 42 and which is rotatable relative to the coupling rod 37'. Preferably, the worktable 40 includes a fixed part 402 which is secured to the mounting frame 30, and a turnable part 401 which has the coupling block 44 anchored on the coupling rod 37'. As such, referring to FIGS. 5 and 12, the turnable part 401 can be forced to turn about the coupling rod 37' so as to shield or expose the accommodation space.

Referring to FIGS. 6 to 10, the support seat 50 is received movably in the accommodation space, and includes first and second supported ends 52,53 which are opposite to each other in the longitudinal direction, and a seat frame 51 which is interposed between the first and second supported ends 52,53. The first and second supported ends 52,53 have arc-shaped blocks 521,531 which are configured to be journalled on the upper surfaces 331,341 of the first and second bearing members 33,34, respectively, and to be slidable relative thereto along the sliding paths, respectively. The seat frame 51 includes a mount segment 54 configured as a post and disposed proximate to the first supported end 52, and a seat segment 57 disposed proximate to the second supported end 53 and preferably defining a concavity 56. In addition, the first supported end 52 has a screw bore 522 formed therein and registered with the second access slot 35.

The transmission unit 60 includes a fixed seat 61 which is secured on the underside of the first supported end 52, a swingable seat 62 which is pivoted to the fixed seat 61 by a pin 64 about a pivot axis in the transverse direction, and a motor 63 which is secured on the swingable seat 62 by means of screws 65 and which has an output shaft 631 that extends in the transverse direction to deliver a driving force. Preferably, a compression spring 66 is disposed between the fixed seat 61 and the motor 63 to bias the motor 63 downwardly.

The cutting unit 70 includes a blade shaft 74, a saw blade 75, a spindle 71, and a coupler.

The blade shaft 74 includes mount and driven ends 742,741 which are disposed at opposite sides of the seat segment 57 in the transverse direction, and a shaft body 745 interposed between the mount and driven ends 742,741. The driven end 741 is coupled to the output shaft 631 of the motor 63 by means of a belt-and-pulley mechanism 77 so as to be driven by the driving force of the output shaft 631 to rotate about a first axis parallel to the pivot axis. The belt-and-pulley mechanism 77 includes pulleys 771,772 respectively mounted on the output shaft 631 and the driven end 741, and a belt 773 trained on the pulleys 771,772.

The saw blade 75 is secured to be rotated with the mount end 742 of the blade shaft 74 in a manner that the saw blade 75 is forced to abut against a ring 743 of the mount end 742 by a screw nut 78, and has a cutting region 751 which extends above the top surface 41 of worktable 40 in the upright direction through the opening 43.

The spindle 71 is sleeved on and is rotatable relative to the mount segment 54 about a second axis that is parallel to the first axis, and has a surrounding toothed portion 76.

The coupler includes a sleeve 73 which surrounds and which permits rotation of the shaft body 745 of the blade shaft 74, and which passes through the concavity 56, and a linkage 72 which interconnects the spindle 71 and the sleeve 73 such that when the spindle 71 is rotated about the second axis from a starting point to an end point, the shaft body 745 is turned about the second axis from a first angular position to a second angular position.

The height adjusting unit 80 is provided to rotate the spindle 71 about the second axis, and includes a fixed seat 81 secured on a support plate 55 of the seat segment 57, a height adjusting rod 82 mounted rotatably on the fixed seat 81 about a third axis in the longitudinal direction, and an operating knob 83. The height adjusting rod 82 includes an actuating end 821 which has a threaded surface meshing with the surrounding toothed portion 76 of the spindle 71 so as to actuate the spindle 71 to rotate about the second axis, an operating end 822 which is opposite to the actuating end 821 in the longitudinal direction and which is disposed outwardly of the first side frame portion 31 so as to be operated externally, and a shank segment 823 which is interposed between the actuating end 821 and the operating end 822, which passes through the first access slot 36, and which is shiftable along the first path. The operating knob 83 is mounted on the operating end 822. In this embodiment, the threaded surface of the actuating end 821 and the surrounding toothed portion 76 of the spindle 71 are a worm and worm gear mechanism.

The inclination adjusting unit 90 includes a mounting seat 91, an inclination adjusting rod 92, an operating rod 942, a hand wheel 95, and a fastening member 93.

The mounting seat 91 has a secured end which is secured to the underside of the first supported end 52 adjacent to the fixed seat 61, and a pulled end which is distal from the first supported end 52 in the upright direction and which has a screw hole 911 extending in the transverse direction. A support seat 941 is secured on the inner surface 311 of the first side frame portion 31 for supporting the inclination adjusting rod 92. The inclination adjusting rod 92 has a threaded end 921 which engages threadedly the screw hole 911 and which is rotatable about a fourth axis parallel to the first axis so as to screw in or out of the screw hole 911 along the fourth axis, and a driven end 922 which is provided with a first bevel gear 943 thereon. The operating rod 942 extends in the longitudinal direction, and has a coupling end which is provided with a second bevel gear 944 that meshes with the first bevel gear 943, and an externally operated end which is disposed outwardly of the first side frame portion 31 and which is operable to rotate the operating rod 942 about a fifth axis in the longitudinal direction. The hand wheel 95 is mounted on the externally operated end of the operating rod 942. As such, when the hand wheel 95 is rotated, the threaded end 921 of the inclination adjusting rod 92 can be rotated to screw in or out the screw hole 911, thereby pulling the pulled end of the mounting seat 91 towards or away from the coupling end of the operating rod 942 so as to move the first supported end 52 along the sliding path. Therefore, an angular position of the cutting region 751 of the saw blade 75 can be changed relative to the worktable 40, thereby changing the inclination of the cutting region 751.

Referring to FIGS. 5, 6 and 8, the fastening member 93 includes a locking bolt 930, a washer 935, and a compression spring 936. The locking bolt 930 has an enlarged head 931, a threaded shank 932 which extends through the second access slot 35 and which engages threadedly the screw bore 522 in the first supported end 52 so as to permit screw-in movement thereof relative to the first supported end 52, and a handle 934 which is secured on the enlarged head 931 and which is operable to rotate the threaded shank 932 relative to the screw bore 522. The washer 935 is sleeved on the threaded shank 932, and is disposed outwardly of the first side frame portion 31. The compression spring 936 is disposed between the enlarged head 931 and the washer 935 to bias the enlarged head 931 away from the washer 935. As such, when the threaded shank 932 is screwed in the screw bore 522, the enlarged head 931 is moved toward the washer 935 against the biasing action of the compression spring 936 so as to permit abutment of the washer 935 against the first side frame portion 31, thereby fastening the first supported end 52 relative to the first side frame portion 31. On the contrary, when the threaded shank 932 is screwed out of the screw bore 522, the washer 935 can be released from the first side frame portion 31, thereby permitting movement of the first supported end 52.

Figure 10:
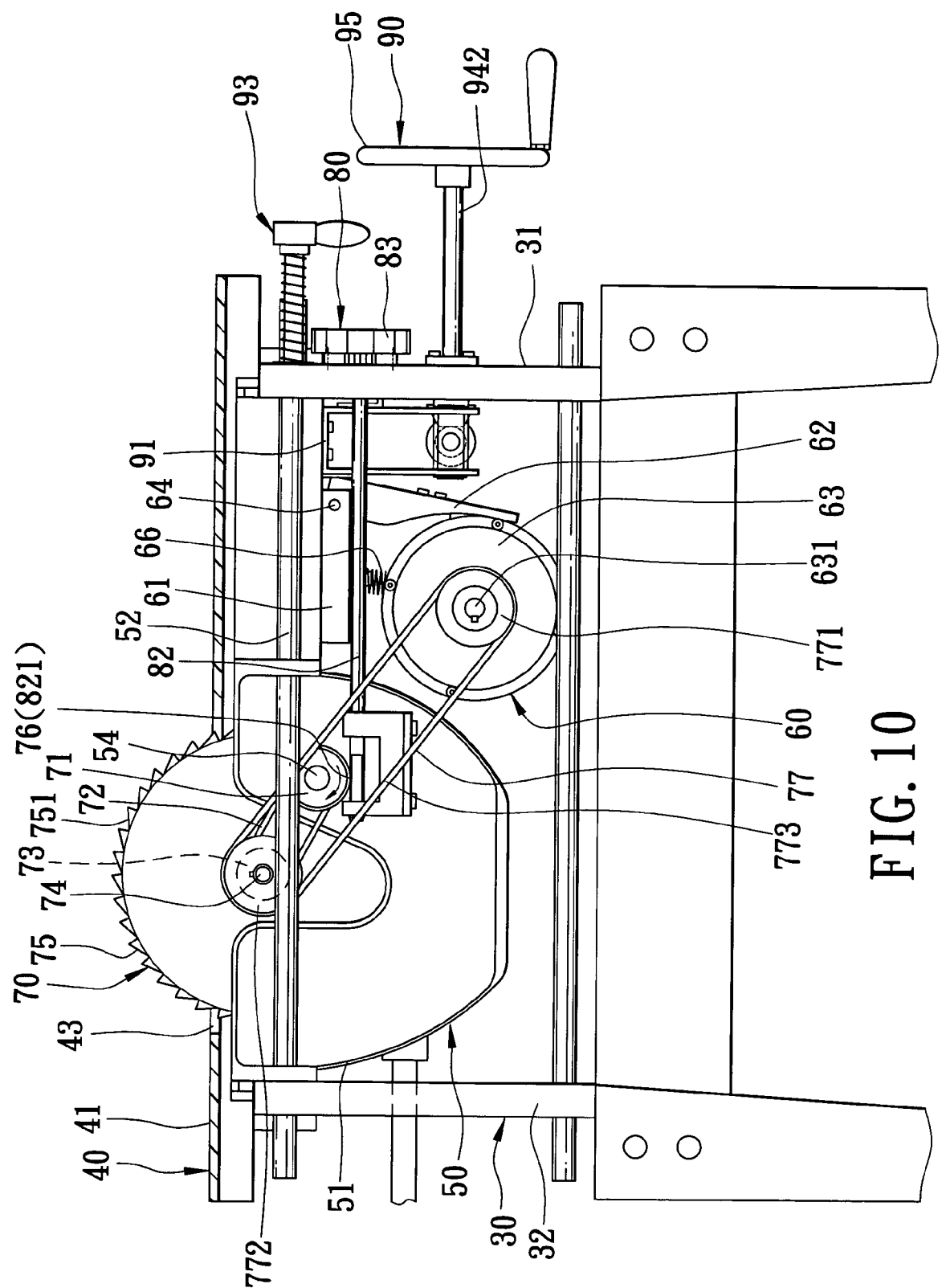
FIG. 10 is a schematic, partly sectioned side view of the preferred embodiment in a lifted position.
Figure 11:
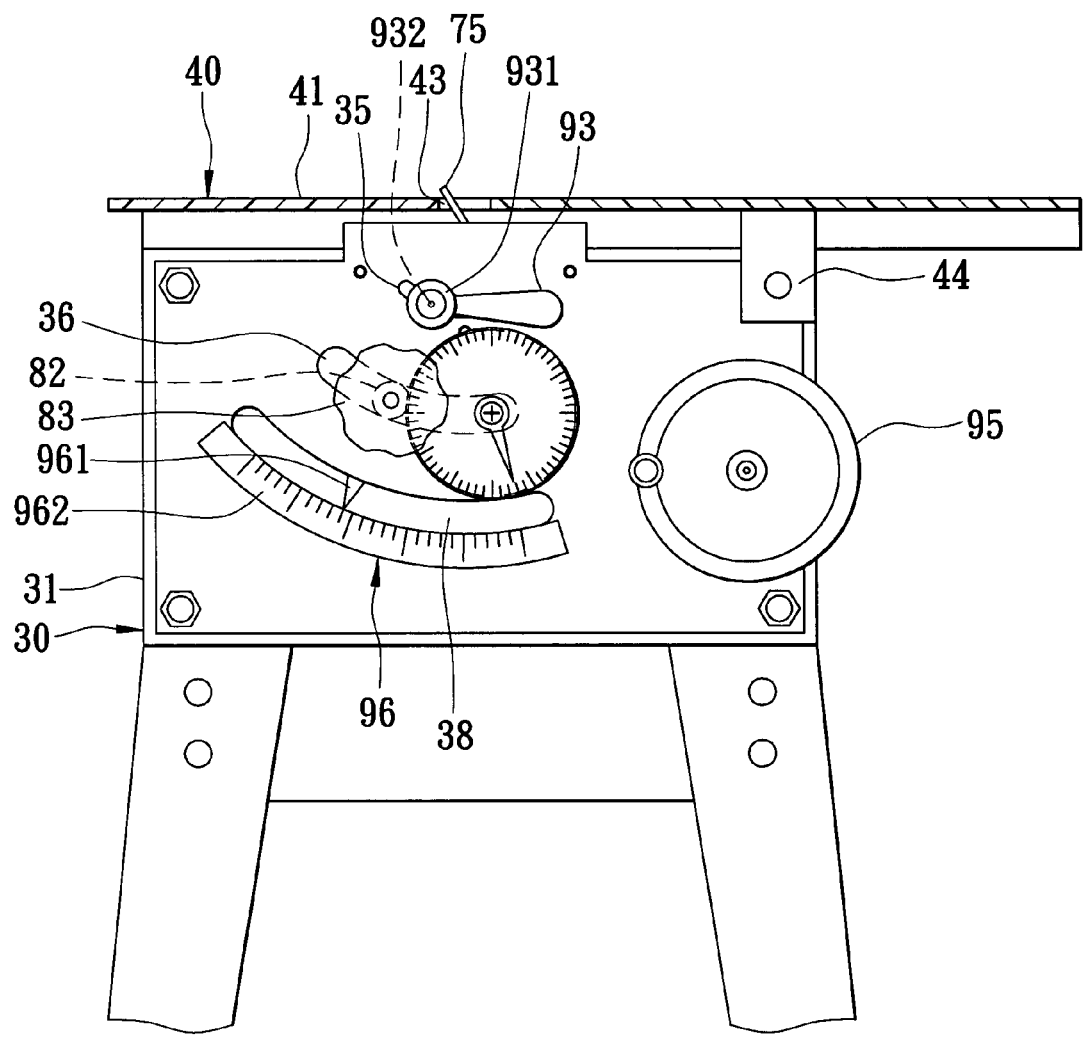
FIG. 11 is a schematic front view of the preferred embodiment in a tilted position.

As shown in FIGS. 6 and 10, when it is desired to adjust the height of the saw blade 75, the operating knob 83 is rotated to rotate the spindle 71 so as to angularly move the sleeve 73 about the second axis, thereby moving the blade shaft 74 to change the height position of the cutting region 751 relative to the worktable 40. Moreover, the movement of the blade shaft 74 results in movements of the pulley 772, the belt 773, and the motor 63 so as to rotate the swingable seat 62. Due to the weight of the motor 63 and by virtue of the compression spring 66, the operating tension of the belt 773 can be maintained to enable effective transmission of the driving force of the output shaft 631 to rotate the blade shaft 74.

Figure 7:
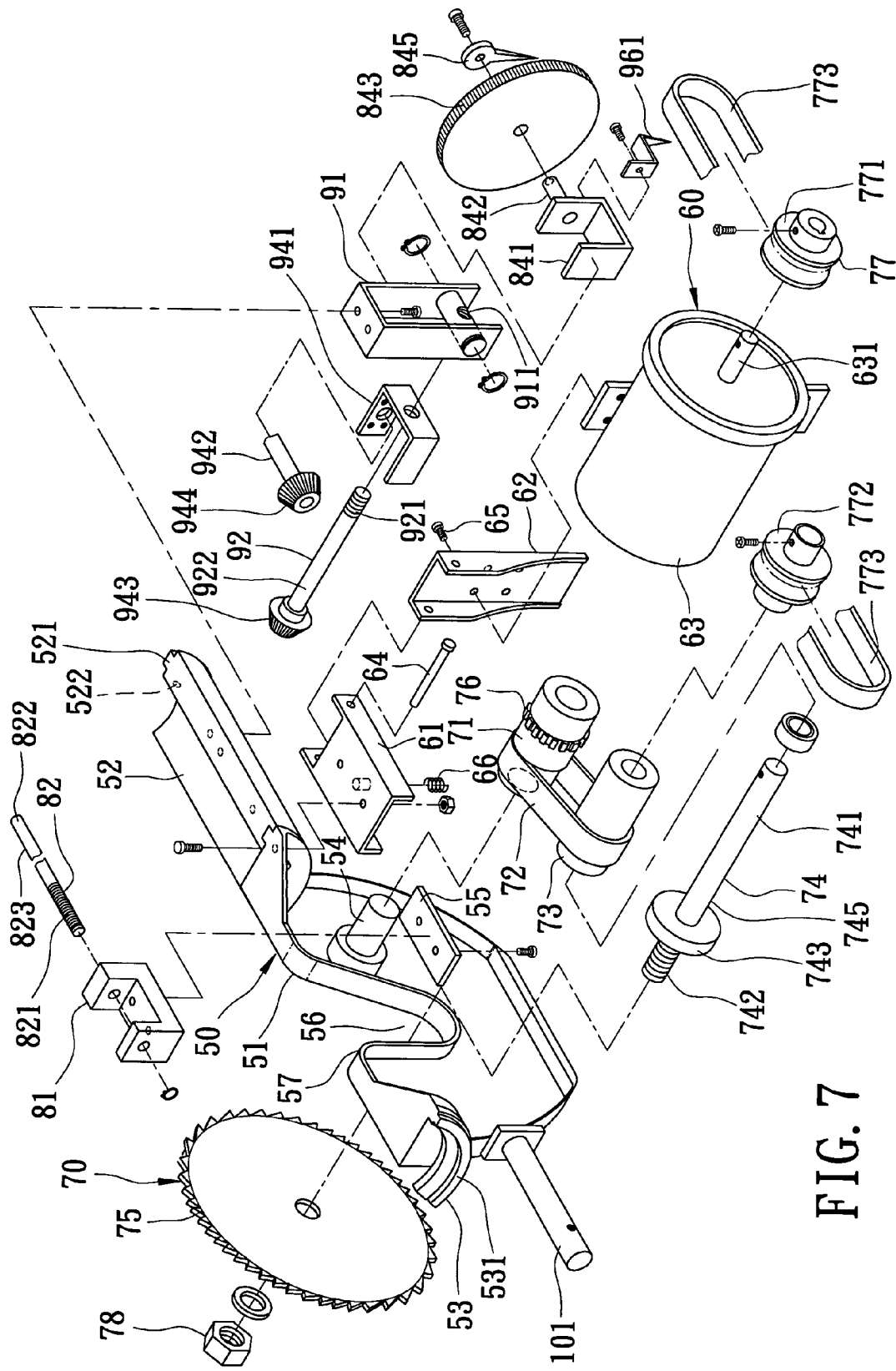
FIGS. 7 to 9 are fragmentary exploded views of the preferred embodiment.

Preferably, as shown in FIGS. 5, 7 and 8, a height indicating unit 84 includes a coupling seat 841 which is secured on the mounting seat 91, a post 842 which is secured to the coupling seat 841 and which extends through the first access slot 36, a gear wheel 843 which is mounted on the post 842 and which is rotatable relative to the post 842 about a sixth axis parallel to the third axis and which has a scale 844, an indicator 845 which is secured to the post 842 and which cooperates with the scale 844 to display the height of the cutting region 751 of the saw blade 75, and a gear 846 which is mounted on and which is rotated with the operating end 822 of the height adjusting rod 82, which meshes with the gear wheel 843, and which is rotates the gear wheel 843 relative to the indicator 845.

Alternatively, the post 842 can be secured to the mounting seat 91 without the need for the coupling seat 841.

Referring to FIGS. 5, 6, 7 and 11, during adjustment of the inclination of the saw blade 75, when the mounting seat 91 is actuated to move the first supported end 52 along the sliding path, the support seat 50, the transmission unit 60, the cutting unit 70 and the height adjusting unit 80 are moved, thereby changing the inclination of the saw blade 75 relative to the top surface 41 of the worktable 40. Since the height adjusting rod 82 is shiftable along the first path of the first access slot 36, and since the threaded shank 932 is shiftable along the second path of the second access slot 35, the process of adjusting the inclination of the saw blade 75 will not be obstructed.

Preferably, as shown in FIGS. 5, 7, 8 and 11, an inclination indicating unit 96 includes an indicator 961 which is secured to and which is moved with the mounting seat 91 or the coupling seat 841, a scale 962 which is provided on the first side frame portion 31, and a window 38 which is formed in the first side frame portion 31 adjacent to the scale 962 and which is configured to correspond to the sliding path of the first supported end 52 and to permit the indicator 961 to be seen externally so that the degree of inclination of the cutting region 751 of the saw blade 75 can be determined with reference to the scale 962.

Preferably, as shown in FIGS. 6, 7 and 9, a blade protecting unit 100 includes an anchored shaft 101 which is secured to the seat frame 51 and which extends through the third access slot 322 in the second side frame portion 32, a coupling block 102 which is secured on the anchored shaft 101 at the outside of the second side frame portion 32, and a cover 103 which is pivoted to the coupling block 102 about a second pivot axis in the transverse direction and which is configured to cover or expose the saw blade 75 when turned about the second pivot axis to a closed position or an open position.

Figure 12:
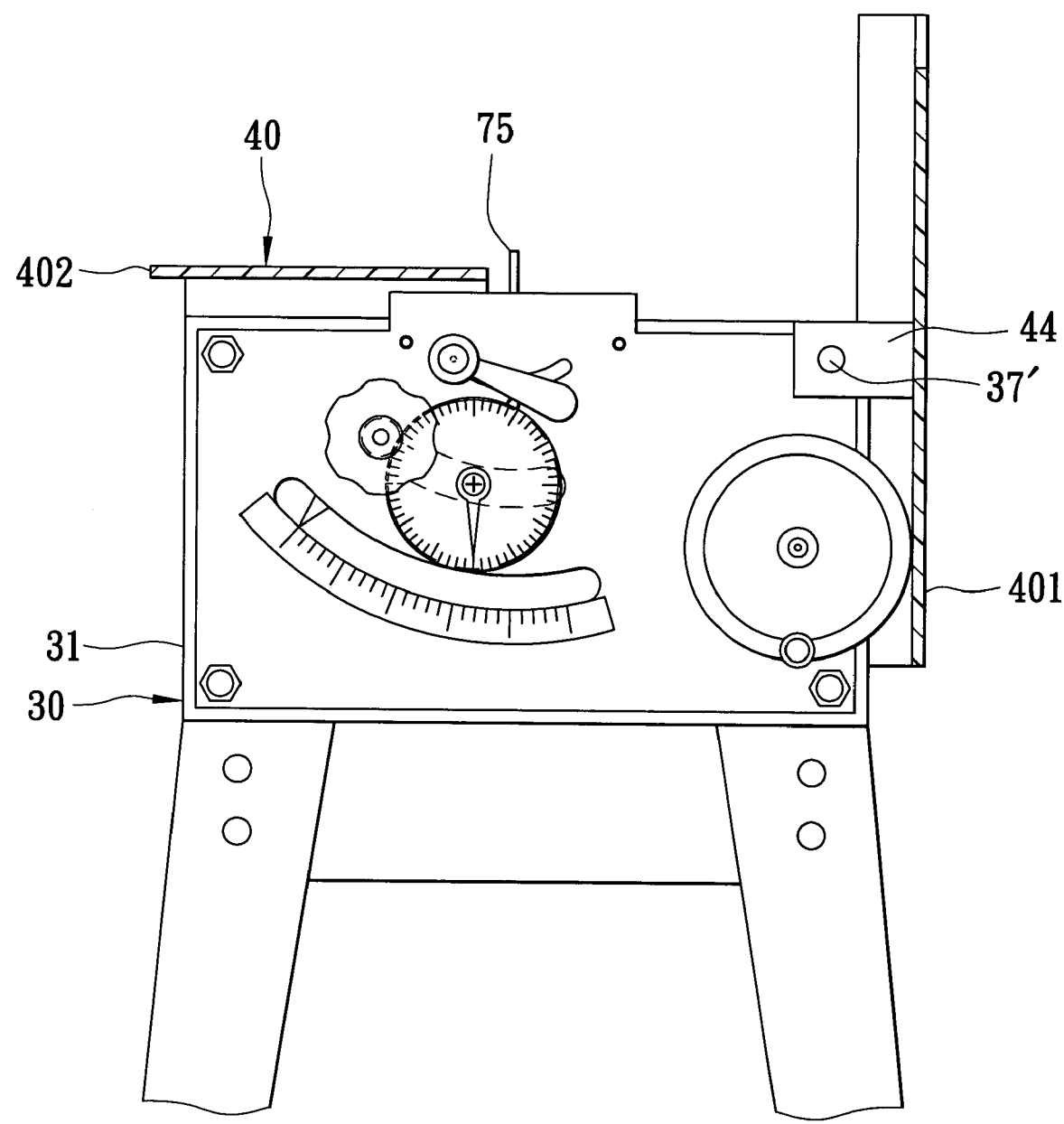
FIG. 12 is a schematic front view of the preferred embodiment, showing a worktable is in an opened state.

As illustrated, since all of the transmission unit 60, the cutting unit 70, the height adjusting unit 80, and the inclination adjusting unit 90 are disposed between the support seat 50 and the first side frame portion 31, and are not connected to the worktable 40, the worktable 40 can be secured to the mounting frame 30 after the aforesaid units are mounted in place, thereby facilitating assembly of the table saw. In addition, when it is desired to replace the blade saw 75, the worktable 40 can be turned pivotably to expose the accommodation space of the mounting frame 30, as shown in FIG. 12, for replacement of the saw blade 75 and maintenance of other components in the accommodation space. Moreover, since the worktable 40 does not carry any components of the table saw, it can be manufactured by injection molding, thereby reducing the overall weight and cost of the table saw.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. A table saw comprising: a mounting frame having first and second side frame portions which are spaced apart from each other in a longitudinal direction to define an accommodation space therebetween, and first and second bearing members which are secured on said first and second side frame portions, respectively, each of said first and second side frame portions extending in a transverse direction relative to the longitudinal direction, and defining a sliding path, said first side frame portion having a first access slot extending in the transverse direction and along a first path that corresponds to the sliding path; a worktable mounted on and turnable relative to one of said first and second side frame portions so as to shield or expose said accommodation space; a support seat received in said accommodation space, and including first and second supported ends which are opposite to each other in the longitudinal direction and which are configured to be journalled on said first and second bearing members, respectively, and to be slidable relative thereto along the sliding path, respectively, and a seat frame which is interposed between said first and second supported ends, and which includes mount and seat segments disposed proximate to said first and second supported ends, respectively; a motor mounted under said mount segment, and pivotable relative to said mount segment about a pivot axis in the transverse direction, said motor having an output shaft extending in the transverse direction to deliver a driving force; a blade shaft including mount and driven ends which are disposed at opposite sides of said seat segment in the transverse direction, said driven end being coupled to said output shaft so as to be driven by the driving force to rotate about a first axis parallel to the pivot axis, said blade shaft further including a shaft body interposed between said mount and driven ends; a saw blade mounted to be rotated with said mount end of said blade shaft, and having a cutting region which extends above said worktable in an upright direction; a spindle mounted on said mount segment, and rotatable relative to said mount segment about a second axis parallel to the first axis; a coupler disposed to couple said spindle to said shaft body such that when said spindle is rotated about the second axis from a starting point to an end point, said shaft body is turned about the second axis from a first angular position to a second angular position; a height adjusting rod including an actuating end Which is disposed to actuate said spindle to rotate about the second axis, an operating end which is opposite to said actuating end in the longitudinal direction and which is disposed outwardly of said first side frame portion so as to be operable externally, and a shank segment which is interposed between said actuating end and said operating end, which passes through said first access slot, and which is shiftable along the first path; an inclination adjusting member disposed to actuate said first supported end to move along the sliding path so as to change an angular position of said cutting region of said saw blade relative to said worktable; and a fastening member disposed to releasably fasten said first supported end relative to said first side frame portion; and a height indicating unit that includes a post which is secured to said mounting seat and which extends through said first access slot, a gear wheel which is mounted on said post and which is rotatable relative to said post about a third axis parallel to a fourth axis and which has a scale, an indicator which is secured to said post and which cooperates with said scale to display the height of said cutting region of said saw blade, and a gear which is mounted on and which is rotated with said operating end of said height adjusting rod, which meshes with said gear wheel, and which rotates said gear wheel relative to said indicator.

2. The table saw of claim 1, wherein each of the sliding path and the first and second paths is of an arc-shape, and is concaved downwardly and in the upright direction.

3. The table saw of claim 2, wherein said coupler includes a sleeve which surrounds and which permits rotation of said shaft body, and a linkage which interconnects said spindle and said sleeve so as to move said shaft body angularly when said spindle is rotated about the second axis.

4. The table saw of claim 3, wherein said spindle has a surrounding toothed portion, said height adjusting rod being disposed to be rotatable relative to said mount segment about the fourth axis in the longitudinal direction, said actuated end of said height adjusting rod having a threaded surface which meshes with said surrounding toothed portion so as to drive said spindle to rotate about the second axis when said height adjusting rod is rotated about the fourth axis.

5. The table saw of claim 4, wherein said inclination adjusting member includes a mounting seat secured to said first supported end, and including a pulled end which is distal from said first supported end in the upright direction, and which has a screw hole that extends in the transverse direction, an inclination adjusting rod having a threaded end which engages threadedly said screw hole, and which is rotatable relative to said mounting seat about a fifth axis parallel to the first axis so as to screw in or out of said screw hole along the fifth axis, and a driven end which is provided with a first bevel gear thereon, and an operating rod extending in the longitudinal direction, and having a coupling end which is provided with a second bevel gear that meshes with said first bevel gear, and an externally operated end which is disposed outwardly of said first side frame portion and which is operable to rotate said operating rod about a sixth axis in the longitudinal direction so as to rotate said threaded end of said inclination adjusting rod to screw in said screw hole, thereby pulling said pulled end towards said coupling end of said operating rod to result in movement of said first supported end along the sliding path.

6. The table saw of claim 5, wherein said first supported end has a screw bore formed therein, said first side frame portion having a second access slot which extends along a second path that corresponds to the sliding path, said fastening member including a locking bolt having an enlarged head and a threaded shank which extends through said second access slot and which engages threadedly said screw bore so as to permit screw-in movement thereof relative to said first supported end, a washer sleeved on said threaded shank and disposed outwardly of said first side frame portion, and a spring disposed between said enlarged head and said washer, and biasing said enlarged head away from said washer such that when said threaded shank is screwed in said screw bore, said enlarged head is moved toward said washer against biasing action of said spring so as to permit abutment of said washer against said first side frame portion.

7. The table saw of claim 5, further comprising an inclination indicating unit that includes an indicator secured to and moved with said mounting seat, a scale provided on said first side frame portion, and a window formed in said first side frame portion adjacent to said scale and configured to correspond to the sliding path and to permit said indicator to be seen externally so that the degree of inclination of said cutting region is determinable with reference to said scale.

8. The table saw of claim 1, further comprising a biasing member disposed to bias said motor away from said blade shaft.

9. The table saw of claim 1, further comprising a blade protecting unit that includes a third access slot formed in said second side frame portion and defining a third path corresponding to the sliding path, an anchored shaft secured to said seat frame and extending through said third access slot, and a cover pivoted to said anchored shaft about a second pivot axis in the transverse direction and configured to cover or expose said saw blade when turned about the second pivot axis to a closed position or an open position.

* * * * *